US006075243A

United States Patent [19]

Nabeshima et al.

[11] Patent Number: 6,075,243
[45] Date of Patent: *Jun. 13, 2000

[54] MASS SPECTROMETER

[75] Inventors: Takayuki Nabeshima, Kokubunji; Minoru Sakairi, Tokorozawa; Yasuaki Takada, Kokubunji; Yukiko Hirabayashi, Kokubunji; Hideaki Koizumi, Tokyo, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,184

[22] Filed: Mar. 27, 1997

[30] Foreign Application Priority Data

Mar. 29, 1996 [JP] Japan .................................... 8-075851

[51] Int. Cl.[7] ............................ B01D 59/44; H01J 49/00

[52] U.S. Cl. ............................................ 250/292; 250/281

[58] Field of Search .................................... 250/288, 292, 250/281

[56] References Cited

U.S. PATENT DOCUMENTS

| | | | |
|---|---|---|---|
| 4,999,492 | 3/1991 | Nakagawa | 250/288 |
| 5,055,678 | 10/1991 | Taylor et al. | 250/292 |
| 5,077,472 | 12/1991 | Davis | 250/292 |
| 5,352,892 | 10/1994 | Mordehai et al. | 250/292 |
| 5,426,301 | 6/1995 | Turner | 250/288 |
| 5,481,107 | 1/1996 | Takada et al. | 250/288 |
| 5,559,337 | 9/1996 | Ito et al. | 250/288 |
| 5,576,540 | 11/1996 | Jolliffe | 250/292 |
| 5,663,560 | 9/1997 | Sakairi et al. | 250/288 |
| 5,672,868 | 9/1997 | Mordehai et al. | 250/292 |
| 5,696,376 | 12/1997 | Doroshenko et al. | 250/292 |
| 5,734,162 | 3/1998 | Dowell | 250/292 |
| 5,789,747 | 8/1998 | Kato et al. | 250/292 |
| 5,825,027 | 10/1998 | Takada et al. | 250/292 |

FOREIGN PATENT DOCUMENTS

| | | |
|---|---|---|
| 61-107650 | 5/1986 | Japan . |
| 7-85834 | 3/1995 | Japan . |

*Primary Examiner*—Bruce C. Anderson
*Attorney, Agent, or Firm*—Beall Law Offices

[57] ABSTRACT

A mass spectrometer in which, in order to reduce noise due to other particles (large charge droplets, neutral particles, photons, or the like), the orbit of ions and the orbit of other particles are separated from each other in the inside of a mass analysis region so as to make it possible to prevent the other particles from reaching an ion detection region without using any deflector.

24 Claims, 11 Drawing Sheets

MASS SPECTROMETER

BACKGROUND OF THE INVENTION

The present invention relates to the field of environmental measurement technique for separating and analyzing an injurious material, and particularly to a technique in which a material contained and mixed in water and injurious to a human body is separated and ionized under atmospheric pressure. Then the ions are separated and analyzed on the basis of the mass-to-charge ratio (hereinafter referred to as "mass") by using an electric field to thereby detect the injurious material. The present invention also relates to a mass spectrometer in which a small amount of metal in water is ionized by using plasma and then the ions are separated and analyzed on the basis of the mass-to-charge ratio by using an electric field to thereby detect the small amount of metal.

A mass analyzing method using an ion trap mass analysis region is one of typical methods for separating and analyzing ions on the basis of the mass by using an electric field. Examples of a mass spectrometer provided with an ion trap mass analysis region include a liquid chromatograph/mass spectrometer (LC/MS) for detecting a material contained in water and injurious to a human body; a microwave induced plasma/mass spectrometer (MIP/MS) and an inductive coupled plasma/mass spectrometer (ICP/MS) each for detecting a small amount of metal contained in water, and so on. In these mass spectrometers, large charged droplets, neutral particles, photons, etc. free from the influence of the electric field or magnetic field become causes of noise so that the efficiency of detecting ions to be measured is lowered if they reach the ion detection region. As a conventional technique to reduce noise caused by those other particles (such as large charged droplets, neutral particles, photons, etc.), a method is employed in which a deflector for deflecting the orbit of ions by an electric field or magnetic field is provided before the ions are inputted into the mass analysis region or after the ions are outputted from the mass analysis region so that only the ions are made to reach the ion detection portion selectively. This is because the other particles are not influenced by the deflector so that the other particles go on an orbit different from the orbit of the ions so as not to reach the ion detection region.

An ion deflector of high performance is required for deflecting ions as described above. An example of the ion deflector provided in the front of the mass analysis region is disclosed in JP-A-7-85834, and an example of the ion deflector provided in the rear of the mass analysis region is disclosed in JP-A-61-107650.

One typical configuration of the LC/MS in which an ion deflector using an electric field is provided in the front of the mass analysis region is shown in FIG. 10.

A sample is delivered to an ion source 1 from means for separating a mixture in a solution, such as a liquid chromatograph, or the like. Ions concerning the sample and generated in the ion source 1 are delivered, through an ion introduction small hole 2 opened in a first electrode, to an intermediate pressure region 4 surrounded by first and second electrodes and evacuated by a pumping portion 3 and are further introduced into a vacuum region through an ion introduction small hole 5 opened in the second electrode. In order to prevent so-called clustering in which water molecules are stuck to ions by cooling in adiabatic expansion at the time of introduction of the atmosphere or ions into a vacuum, the first and second electrodes are heated to about 100° C. by a heater. The ions introduced into the vacuum region are accelerated by an extract electrode 6 and delivered to a double cylindrical electrode electrostatic lens 7 which is an ion deflector. The double cylindrical electrode electrostatic lens is constituted by an inner cylindrical electrode 8 and an outer cylindrical electrode 9 which are coaxial with each other. A plurality of opening portions 10 are provided in the inner electrode 8. The electric field of the outer electrode 9 penetrates into the inside of the inner electrode 10 through the opening portions 10, so that a potential distribution for changing the orbit of ions is formed. When the center axis of the ion introduction small holes 2 and 5 and the extract electrode 6 and the center axis of the double cylindrical electrode electrostatic lens are made off, the ions are deflected so as to go on an orbit 11 indicated by a solid line. If an electrode 13 having an opening portion 12 and a mass analysis region 14 having the same center axis as the axis of the opening portion 12 are disposed so that the axis of the opening portion 12 is located on the orbit 11 of ions at a tail end of the electrostatic lens 7, other particles (large charged droplets, neutral particles, photons, etc. free from the influence of the electric field or magnetic field) go on substantially straight orbit 15. Accordingly, because the other particles strike on positions other than the opening portion so that the other particles are prevented from entering the mass analysis region 14, only the ions are taken into the mass analysis region 14 through the ion inlet hole 12. In this occasion, it is preferable that the electrode 13 is heated by a heater, or the like, in order to reduce stain of the electrode 13 with the other particles. In the inside of the mass analysis region 14, the ions are influenced by high-frequency electric field so that the ions are converged to an orbit in accordance with the mass thereof. A buffer gas necessary for stabilizing the orbit of ions is introduced into the mass analysis region 14 from a buffer gas introduction portion 17. The ions are mass-separated by high-frequency electric field in the inside of the mass analysis region 14 and detected by an ion detector 16.

Next, one typical configuration of the LC/MS in which an ion deflector using a magnetic field is provided in the rear of the mass analysis region is shown in FIG. 11.

A sample is delivered to an ion source 1 from meas for separating a mixture in a solution, such as a liquid chromatograph, or the like. Ions concerning the sample and generated in the ion source 1 are delivered, through an ion introduction small hole 2 opened in a first electrode, to an intermediate pressure region 4 surrounded by first and second electrodes and evacuated by a pumping portion 3 and are further introduced into a vacuum region through an ion introduction small hole 5 opened in the second electrode. In order to prevent so-called clustering in which water molecules are stuck to ions by cooling in adiabatic expansion at the time of introduction of the atmosphere or ions into a vacuum, the first and second electrodes are heated to about 100° C. by a heater. The ions introduced into the vacuum region are accelerated by an extract electrode 6 and delivered to a mass analysis region 14. In the inside of the mass analysis region 14, the ions are influenced by a high-frequency electric field so that the ions are converged to an orbit in accordance with the mass thereof. A buffer gas necessary for stabilizing the orbit of ions is introduced into the mass analysis region 14 from a buffer gas introduction portion 17. The ions are mass-separated by high-frequency electric field in the inside of the mass analysis region 14 and then, together with other particles, outputted from the mass analysis region 14.

A pair of sector electromagnets 18 which are provided so as to be opposite to each other and which serve as an ion deflector, are disposed in the rear of the mass analysis region 14. The other particles delivered to the sector electromagnets 18 go on a substantially straight straight-line orbit 19 so as not to reach an ion detection portion 16 because the other particles are not influenced by the magnetic field, whereas the ions delivered to the sector electromagnets 18 are influenced by the magnetic field to go on a circular orbit 20 so as to reach the ion detection portion 16 where the ions are detected.

The ion deflectors in the aforementioned conventional technique are constituted by a double cylindrical electrode electrostatic lens and a pair of sector electromagnets which are disposed so as to be opposite to each other. By using these deflectors, ions and other particles are separated from each other so that noise can be reduced. The following problems, however, arise.

First, the number of assembling steps for producing these deflectors and assembling the deflectors in the apparatus is increased. Furthermore, high assembling accuracy is required. Next, a space for disposing the deflectors is required, so that the scale of the apparatus is increased. With the increase of the scale, a more severe requirement for making evacuation to keep the vacuum is given to a vacuum pump. Furthermore, the cost and the electric power consumed at the time of the operation of the apparatus are increased because of the additional provision of an electric source for the deflectors, the increase of the discharge volume of the pump, and so on. In addition, the number of apparatus parameters for controlling the orbit of ions accurately is increased, so that operating property is lowered.

SUMMARY OF THE INVENTION

An object of the present invention is to provide a mass spectrometer in which the orbit of ions and the orbit of other particles are separated from each other in the inside of a mass analysis region so that the other particles can be prevented, without use of any deflector, from reaching an ion detection portion.

The mass analysis region using an electric field has an input hole for putting ions into the mass analysis region, and an output hole for putting ions out of the mass analysis region after analysis. Because other particles are not influenced by the electric field, the other particles are considered to go substantially on a straight-line orbit after the entrance of the other particles into the mass analysis region from the input hole. Accordingly, in the case where the axis of the input hole and the axis of the output hole are made off from each other or in the case where the output hole is made off from the orbit of the other particles, the other particles are not outputted from the output hole so that the other particles never reach the ion detection portion.

Specifically, the present invention can be carried out by an ion trap mass analysis region, and so on. The ion trap mass analysis region is constituted by two endcap electrodes disposed so as to be opposite to each other, and one ring electrode disposed so as to enclose a space between the two endcap electrodes. After ions inputted into the ion trap mass analysis region are reserved by using high-frequency electric field, the ions are extracted through a small hole opened on the center axis of one of the endcap electrodes and then mass-analyzed. As a result of calculation of the orbit of ions in the ion trap mass analysis region, it has been found that ions are converged to the center axis sufficiently in a time not longer than the order of millisecond by the effect of collision of the ions with gas particles even in the case where the ions exist in positions separated from the center axis of the endcap electrodes by a distance equivalent to about 25% of the distance between the two endcap electrodes if a light inert gas such as helium, or the like, is introduced into the ion trap mass analysis region. Taking this characteristic of the ion trap mass analysis region into account, it can be understood that ions can be converged without the necessity of putting the ions into the ion trap mass analysis region along the center axis of the endcap electrodes. Accordingly, in the case of an ion trap mass analysis region, ions and other particles can be made to go on different orbits respectively without provision of any ion deflector when ions are inputted into the ion trap mass analysis region from a small hole opened in a position of one of the endcap electrodes which is out of the center axis thereof so that the ions are reserved in the inside of the ion trap mass analysis region whereas the reserved ions are selectively outputted from the ion trap mass analysis region from a small hole opened on the center axis of the endcap electrodes. By using such a structure, noise caused by the other particles at the time of detection can be suppressed.

The present invention relates to an apparatus in which organic material injurious to a human body or a small amount of metal is ionized, and the ions are mass-analyzed, which is characterized in that noise is reduced without using any complicated ion-optics such as deflectors, and which is sufficiently useful for chemical analysis of small amounts of sample.

DESCRIPTION OF THE PREFERRED EMBODIMENTS

Embodiments of the present invention will be described below with reference to the drawings.

Figure 1:
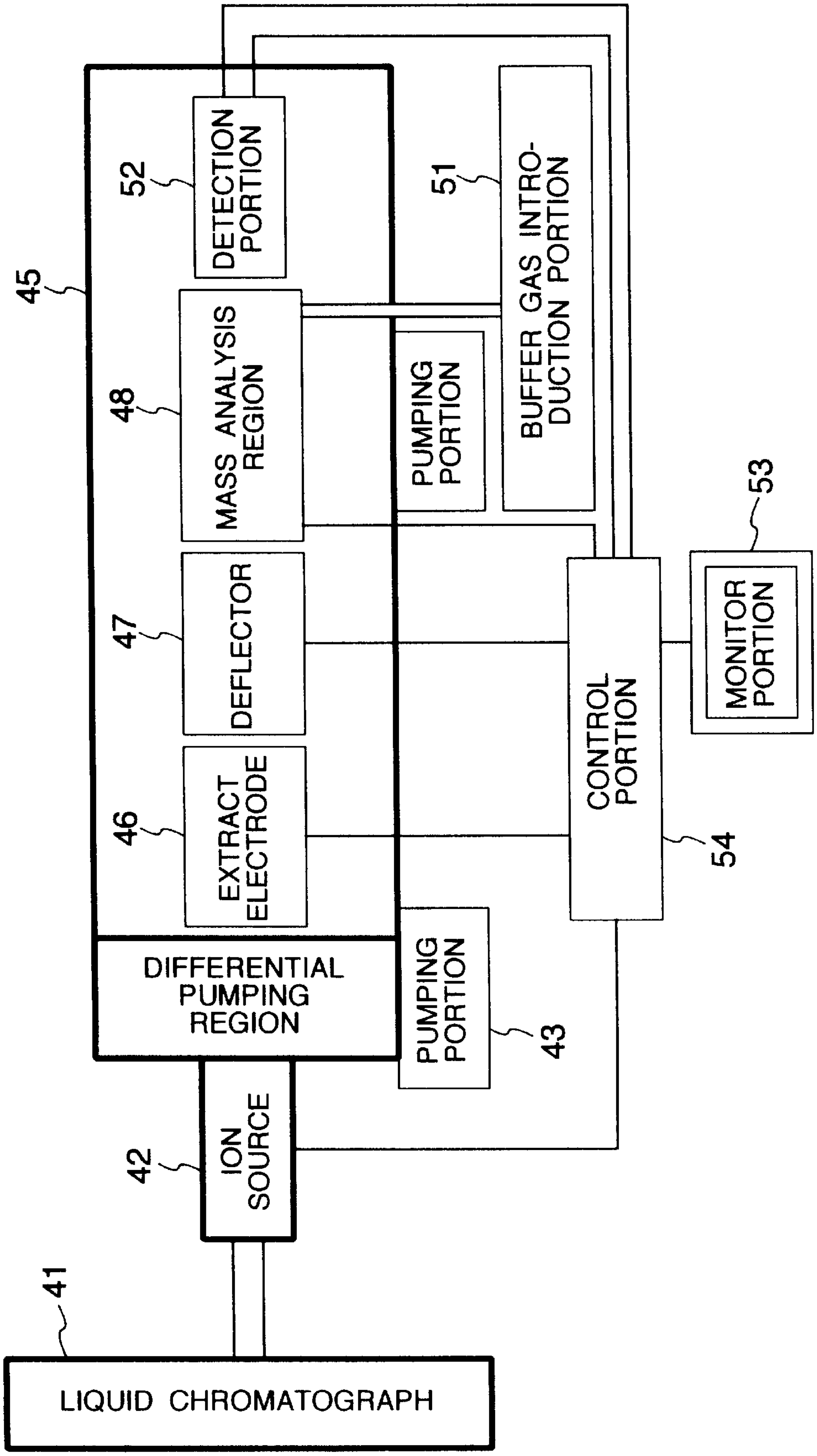
FIG. 1 is a diagram of an apparatus configuration for carrying out the present invention.

FIG. 1 is a diagram showing an apparatus configuration of a mass spectrometer for carrying out the present invention. A mixture sample introduced into a liquid chromatograph 41 is separated and delivered to an ion source 42 so that the mixture sample is ionized under atmospheric pressure. Ions concerning the sample are delivered, through an intermediate pressure region evacuated by a front pumping portion 43, to a vacuum region 45 evacuated by a rear pumping portion.

The ions concerning the sample are introduced into a deflector 47 via an extract electrode 46. By the deflector, only the ions are deflected so as to be introduced into a mass analysis region 48. A buffer gas necessary for stabilizing the orbit of the ions in the inside is introduced into the mass analysis region 48 from a buffer gas introduction region 51. After analyzed in the mass analysis region 48, the ions are detected by an ion detector which is a detection portion 52 and observed in a monitor portion 53. The respective portions of the apparatus are controlled by a control portion 54.

Figure 2:
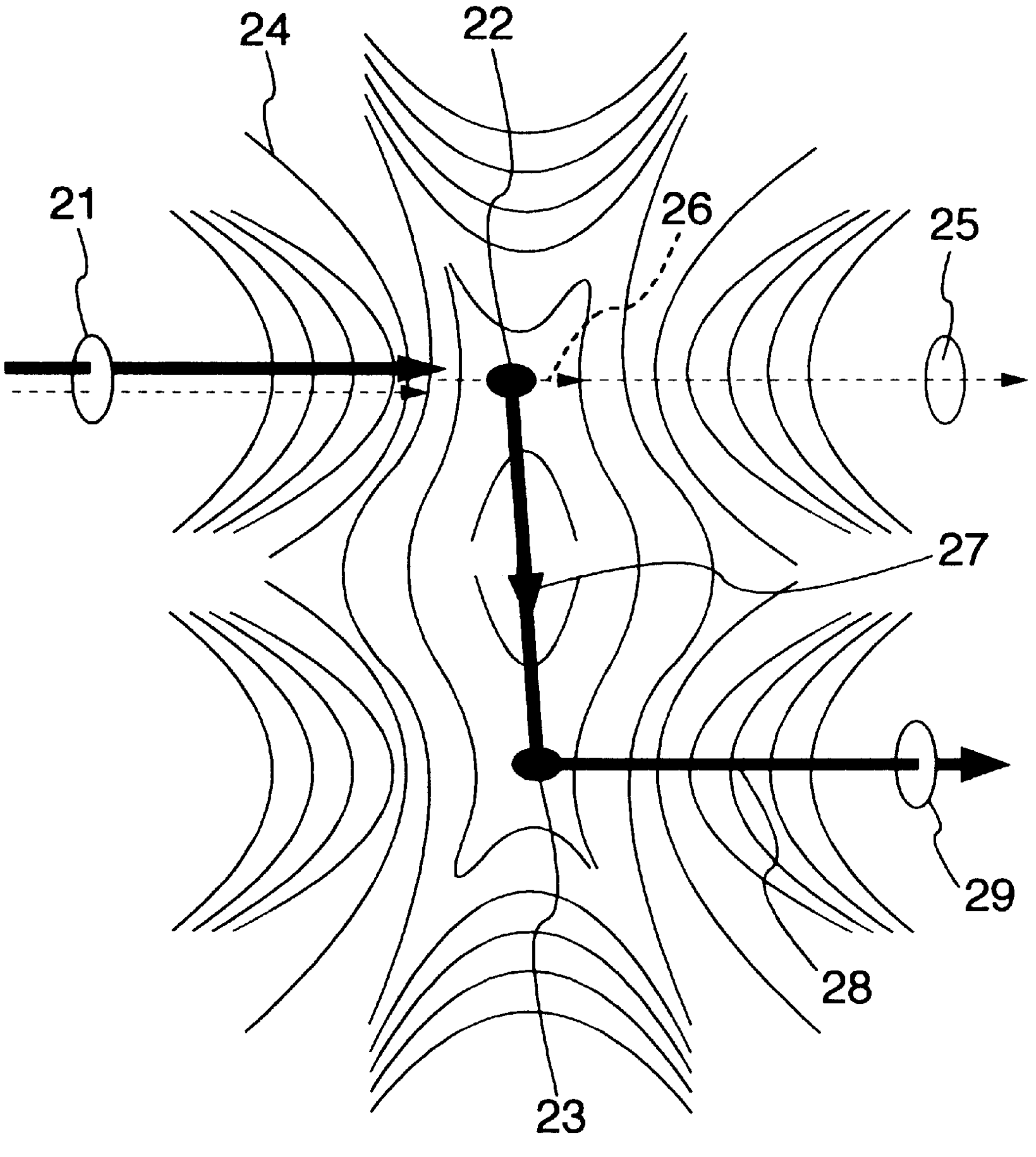
FIG. 2 is a diagram of an apparatus configuration for carrying out the present invention.

FIG. 2 is a view showing the electric field in the inside of the mass analysis region for carrying out the present invention and the orbit of ions and other particles (large charged droplets, photons, etc. free from the influence of electric field and magnetic field).

Ions and other particles are introduced from an ion entrance hole 21 into the inside of the mass analysis region in the presence of the electric field indicated by lines of electric force. In the inside of the mass analysis region, ions are influenced by the electric field so as to be converged to low electric field potential positions 22 and 23. By operating the electric field, the ions converged to the low electric field potential positions 22 and 23 are outputted from the mass analysis region from an ion exit hole 29 via orbits 27 and 28 indicated by a solid line. When mass analysis is carried out, generally, an ion detector is provided in the rear of the mass analysis region so that ions are detected. On the other hand, other particles are not influenced by the electric field so as to reach an opening portion 25 via an orbit 26 extending substantially straightly and then they are outputted from the mass analysis region through the opening portion 25.

Figure 3:
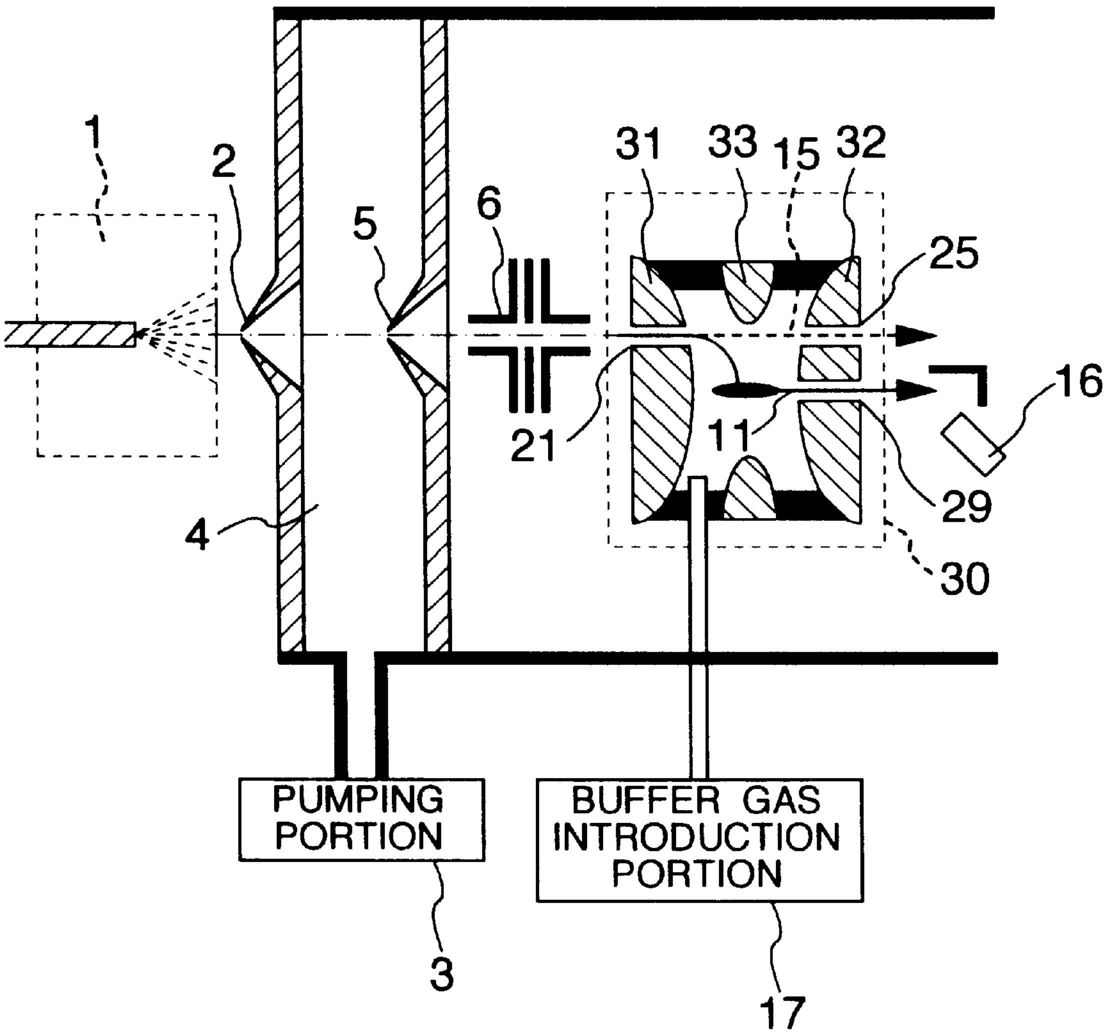
FIG. 3 is a diagram of an apparatus configuration for carrying out the present invention.

FIG. 3 is a diagram showing an apparatus configuration of a mass spectrometer using an ion trap mass analysis region for carrying out the present invention.

A sample is delivered into an ion source 1 from means for separating a mixture in a solution, such as a liquid chromatograph, or the like. Ions concerning the sample and generated in the ion source 1 are delivered, through an ion introduction small hole 2 opened in a first electrode, to an intermediate pressure region 4 surrounded by first and second electrodes and evacuated by a pumping portion 3 and are further delivered, through an ion introduction small hole 5 opened in the second electrode, to a vacuum region. In order to prevent so-called clustering in which water molecules are stuck to ions by cooling in adiabatic expansion at the time of introducing atmosphere or ions into a vacuum, the first and second electrodes are heated to about 100° C. by a heater. The ions introduced into the vacuum region are accelerated by an extract electrode 6 so as to be delivered to an ion trap mass analysis region 30. The ion trap mass analysis region is constituted by two endcap electrodes 31 and 32, and one ring electrode 33 which is disposed so as to enclose a space between the two endcap electrodes. An ion input hole 21 is opened in a position of the front endcap electrode 31 which is out of the center axis thereof. Ions and other particles are together introduced, through the ion input hole 21, into the inside of the ion trap mass analysis region 30. After the ions introduced into the ion trap mass analysis region 30 are converged to be mass-separated by the influence of the high-frequency electric field, the ions are outputted from the ion output hole 29 opened on the center axis of the rear endcap electrode 32 via an orbit 11 indicated by a solid line. On the contrary, the other particles introduced into the ion trap mass analysis region 30 are not influenced by the electric field so that the other particles go on an orbit 15 extending substantially straightly and are outputted through an opening portion 25 opened in the rear endcap electrode 32 coaxially with respect to the ion input hole 21 opened in the front endcap electrode 31. The thus outputted ions are detected by means of an ion detection portion 16 provided in the rear of the ion output hole 29. On the contrary, the thus outputted other particles are not introduced into the ion detection portion. A buffer gas for stabilizing the orbit of ions is introduced into the ion trap mass analysis region 30 from a buffer gas introduction portion 17.

Figure 4:
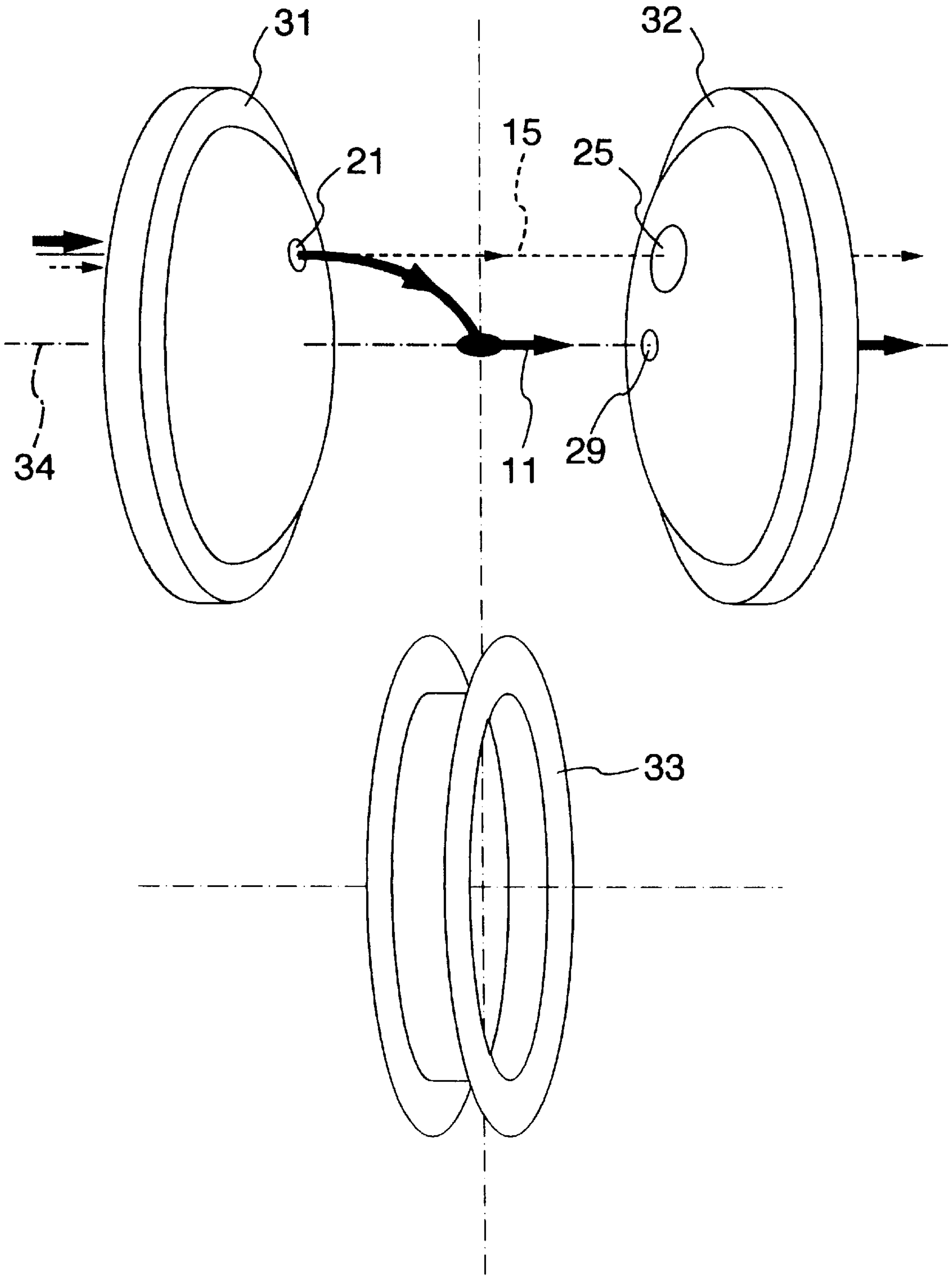
FIG. 4 is a diagram of an apparatus configuration for carrying out the present invention.

FIG. 4 is a detailed view of the ion trap mass analysis region depicted in FIG. 3. Although FIG. 4 shows the positions of the three electrodes as if the two endcap electrodes 31 and 32 were separated from the ring electrode 33, the center axes of the three electrodes are disposed so as to be coincident with each other when the three electrodes are used in the apparatus. Ions and other particles are introduced into the inside of the ion trap mass analysis region through the ion input hole 21 opened in a position of the front endcap electrode 31 which is out of the center axis 34 thereof. After the ions are converged to be mass-separated by the influence of the electric field, the ions go on an orbit 11 indicated by a solid line and are outputted from the ion trap mass analysis region from the ion output hole 29 opened in the rear endcap electrode 32. On the contrary, the other particles are not influenced by the electric field so that the other particles go on an orbit 15 extending substantially straightly and are outputted from the ion trap mass analysis region from the opening portion 25 opened in the rear endcap electrode 32. The area of the opening portion 25 is larger than the area of the ion input hole 21. This is because it is taken into account that the other particles thus inputted are diffused in the inside of the ion trap mass analysis region. From the above description, the orbit of ions and the orbit of other particles can be separated from each other without use of any deflector, so that noise caused by the entrance of the other particles into the ion detector can be reduced.

Figure 5:
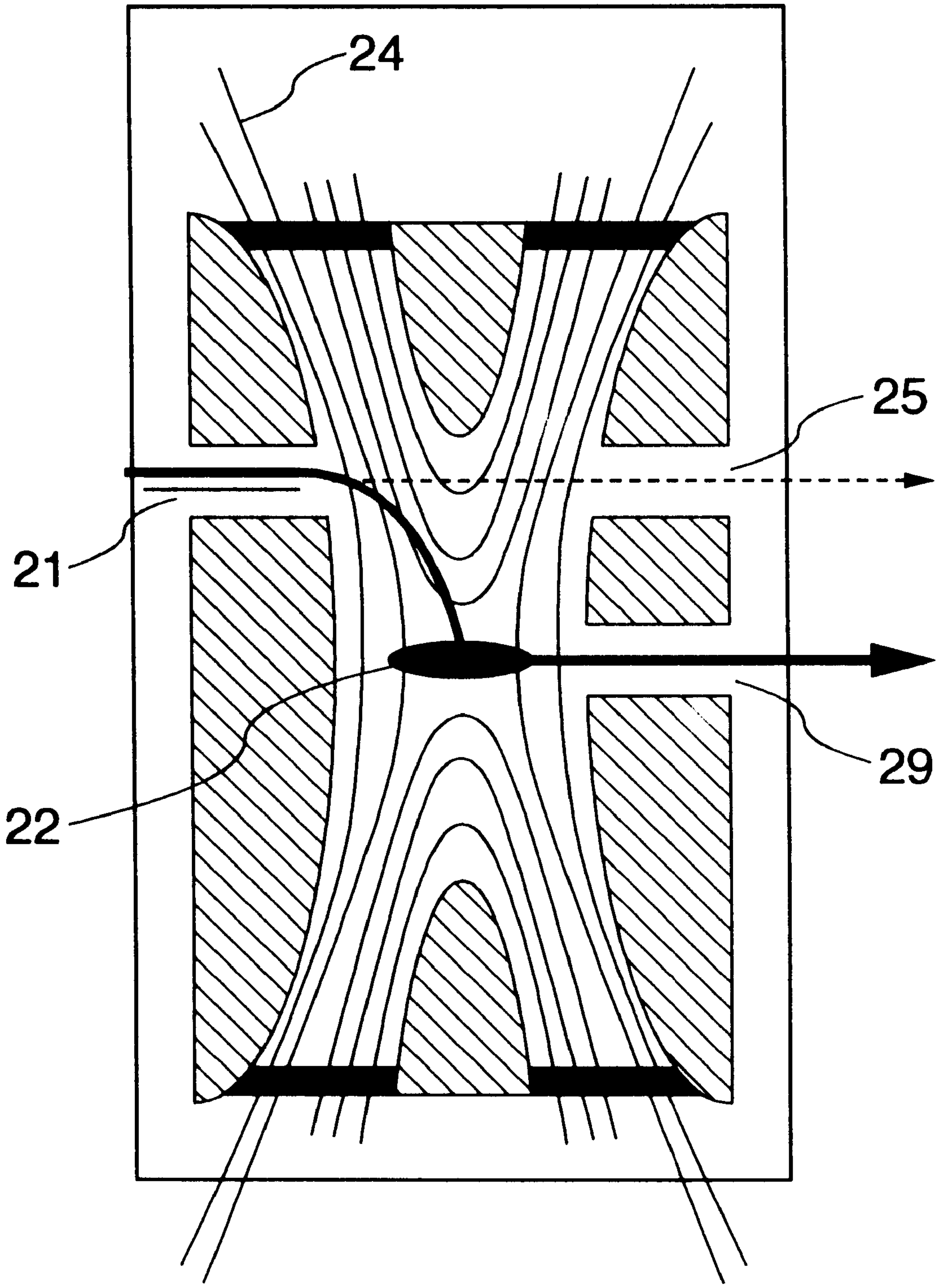
FIG. 5 is a diagram of an apparatus configuration for carrying out the present invention.

FIG. 5 shows a state of electric field in the inside of the ion trap mass analysis region depicted in FIGS. 3 and 4. In the ion trap mass analysis region, an electric field as indicated by lines of electric force 24 in FIG. 5 is generated so that ions inputted into the inside of the ion trap mass analysis region 30 through the ion input hole 21 are influenced by the electric field so as to be converged to a position 22 of low electric field potential. After mass-separated, the ions thus converged are outputted from the ion output hole 29. On the contrary, the other particles are not influenced by the electric field so that the other particles go substantially straightly and are outputted from the opening portion 25.

Figure 6:
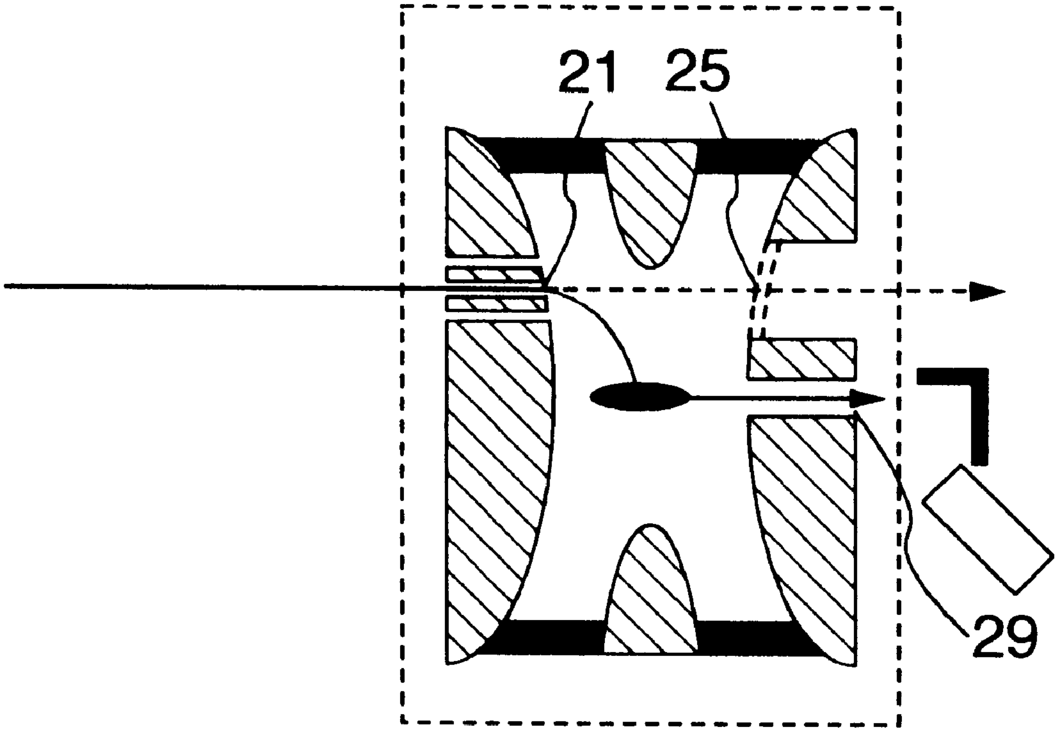
FIG. 6 is a diagram of an apparatus configuration for carrying out the present invention.

FIG. 6 is a view showing another apparatus configuration of the ion trap mass analysis region for carrying out the present invention. Among an ion input hole 21, an opening portion 25 and an ion output hole 29 in this configuration, the ion input hole 21 is constituted by a plurality.of small holes, and the opening portion 25 is constituted by metal mesh. The reason for this is as follows. The efficiency of inputting ions and other particles into the ion trap mass analysis region or outputting ions and other particles from the ion trap mass analysis region can be improved if the respective areas of the ion input hole, opening portion and ion output hole are widened. If these areas are widened, however, the electric field in the inside of the ion trap mass analysis region is disturbed so that the ions cannot be controlled as they were controlled conventionally and, accordingly, the efficiency of detecting ions is deteriorated. In order to widen the respective areas without disturbance of the electric field in the inside of the ion trap mass analysis region, it is essential to use the aforementioned structure of a plurality of small holes and metal mesh. Such a plurality of small holes or metal mesh may be applied to any one of the ion input hole 21, opening portion 25 and ion output hole 29.

Figure 7:
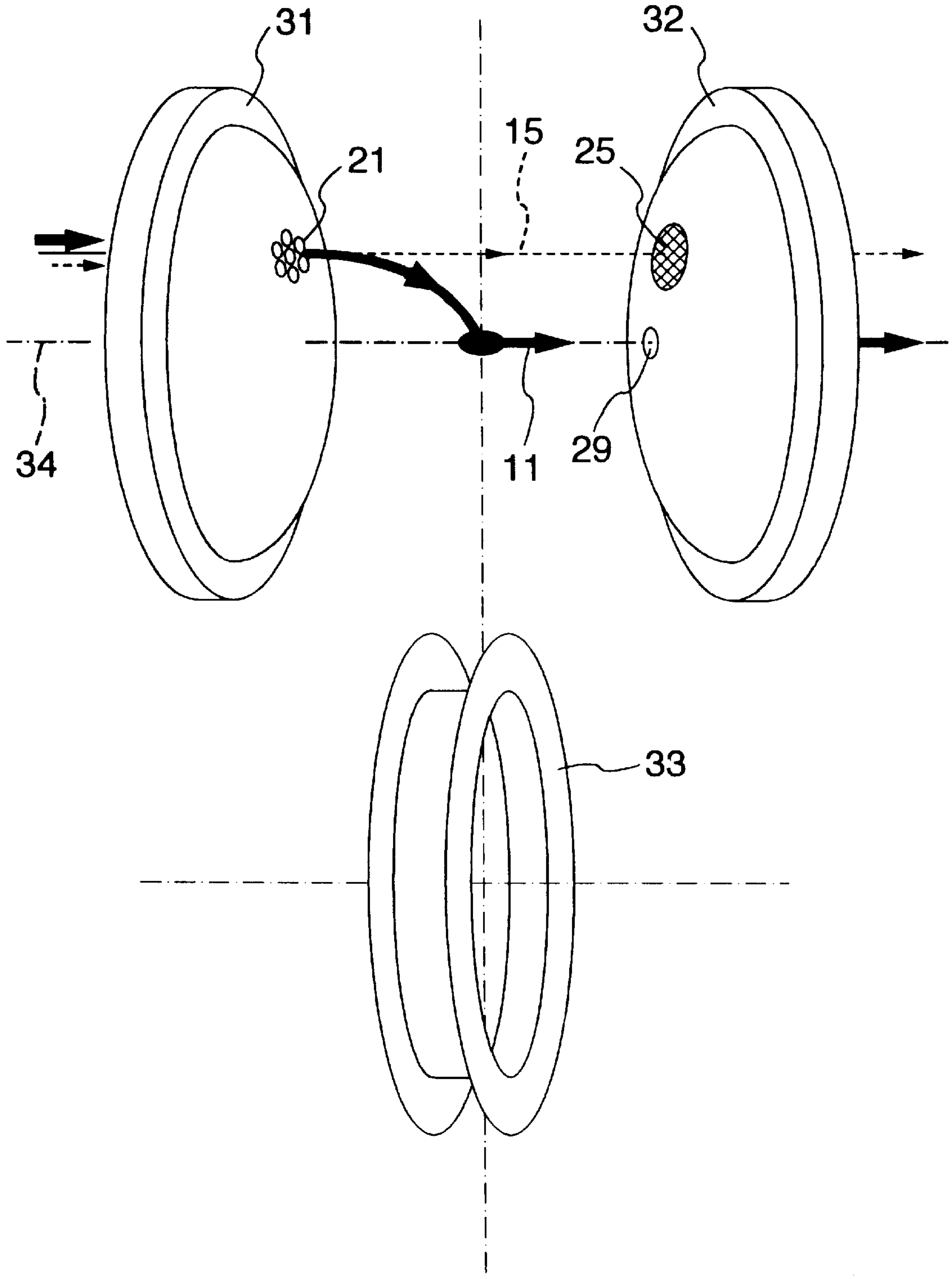
FIG. 7 is a diagram of an apparatus configuration for carrying out the present invention.

FIG. 7 is a detailed view of the ion trap mass analysis region depicted in FIG. 6. Although FIG. 7 shows the positions of the three electrodes as if the two endcap electrodes 31 and 32 were separated from the ring electrode 33, the center axes of the three electrodes are made coincident with each other when the three electrodes are used in the apparatus. Ions and other particles are introduced into the ion trap mass analysis region through the ion input hole 21 which is constituted by a plurality of small holes opened in positions of the front endcap electrode 31 other than the center axis 34 of the endcap electrode 31. After the ions are converged by the influence of the electric field and then mass-separated, the ions go on an orbit 11 indicated by a solid line and are outputted to the outside of the ion trap mass analysis region through the ion output hole 29 opened in the rear endcap electrode 32. On the contrary, the other particles are not influenced by the electric field so that the other particles go on an orbit 15 extending substantially straightly and are outputted to the outside of the ion trap mass analysis region from the opening portion 25 constituted by metal mesh and opened in the rear endcap electrode 32. Because the ion input hole is constituted by a plurality of small holes as described above, the area of the input hole can be widened. Further, because the opening portion is constituted by metal mesh, the other particles can be outputted efficiently without disturbance of the electric field in the inside of the ion trap mass analysis region, in the same manner as described above.

Figure 8:
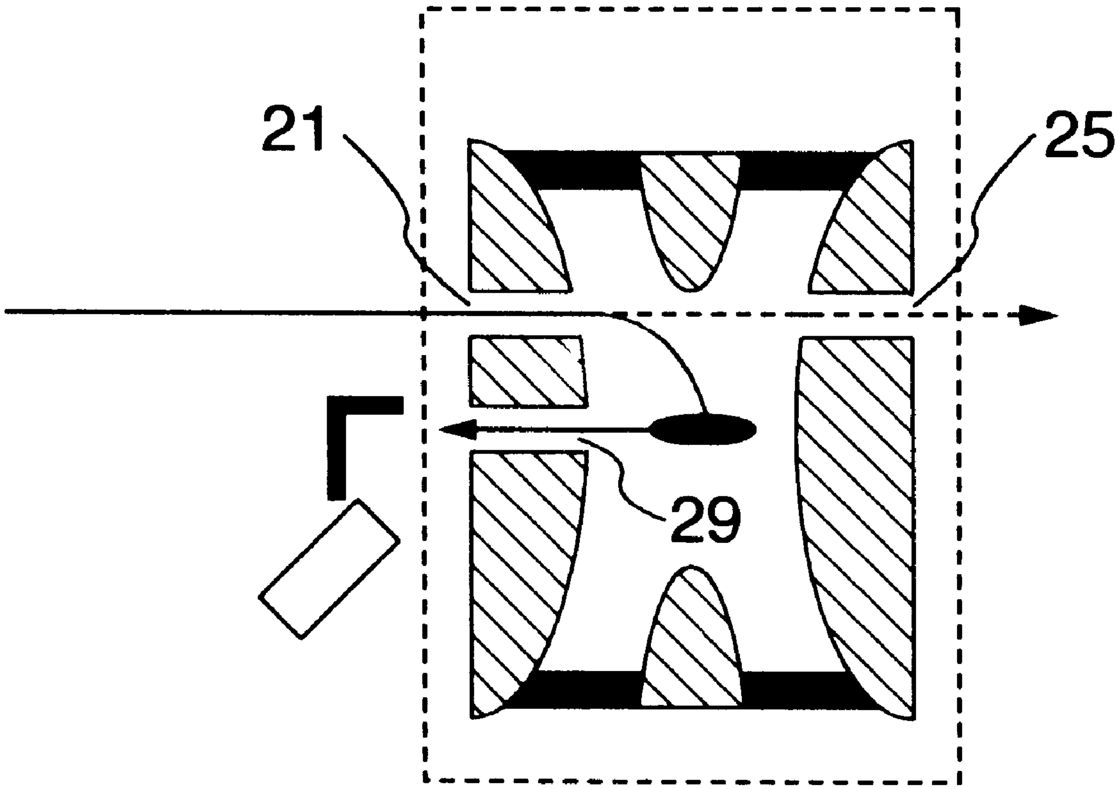
FIG. 8 is a diagram of an apparatus configuration for carrying out the present invention.

FIG. 8 is a view showing a further apparatus configuration of the ion trap mass analysis region for carrying out the present invention. In this configuration, the ion input hole 21 and the ion output hole 29 are provided in one and the same front endcap electrode whereas only the opening portion 25 is provided in the rear endcap electrode. The ion input hole 21 is opened in a position of the front endcap electrode which is out of the center axis thereof. The ion output hole 29 is opened on the center axis of the front endcap electrode. On the other hand, the opening portion 25 is opened in the rear endcap electrode so as to be coaxial with the ion input hole opened in the front endcap electrode 31.

Figure 9:
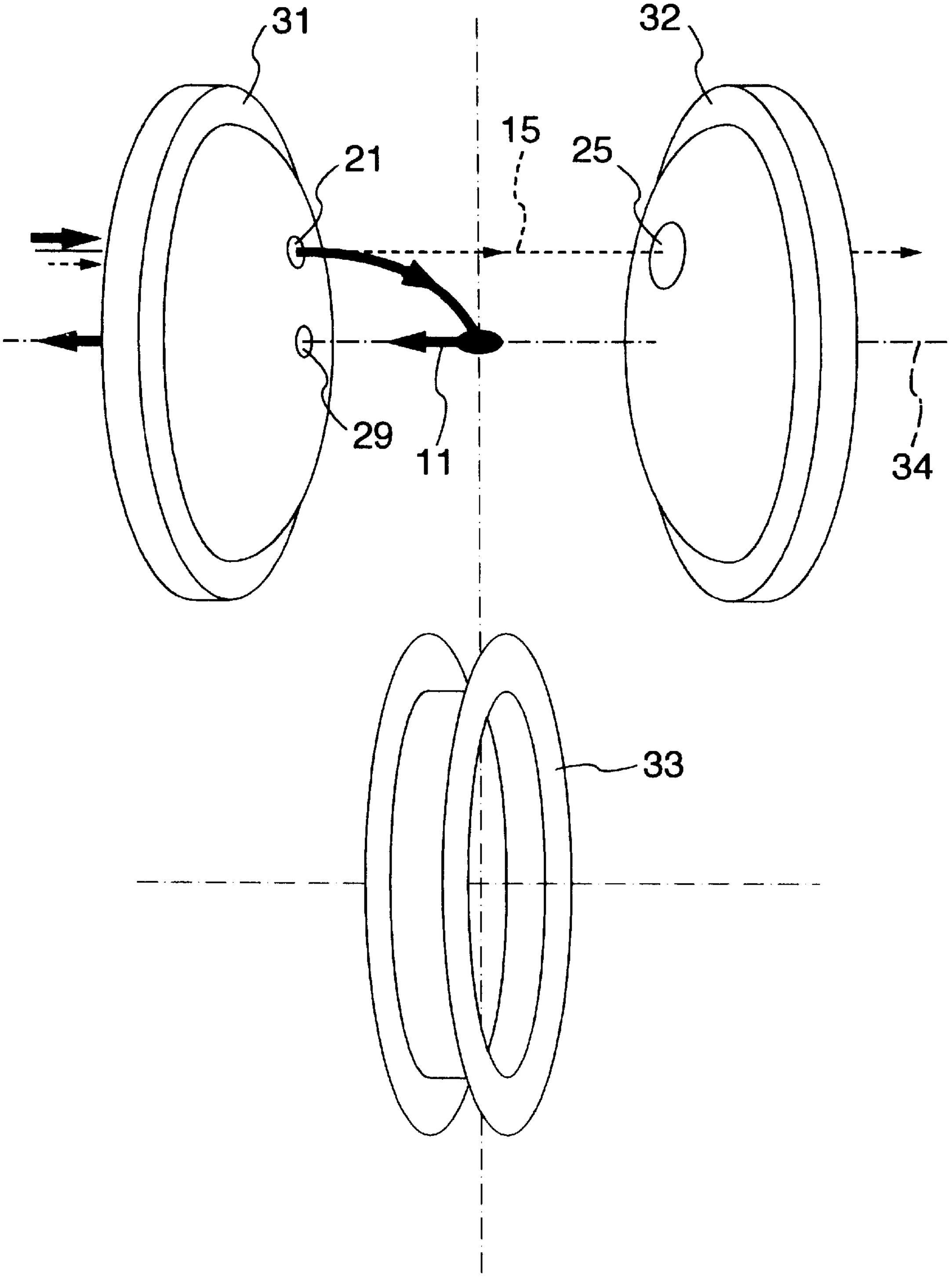
FIG. 9 is a diagram of an apparatus configuration for carrying out the present invention.
Figure 10:
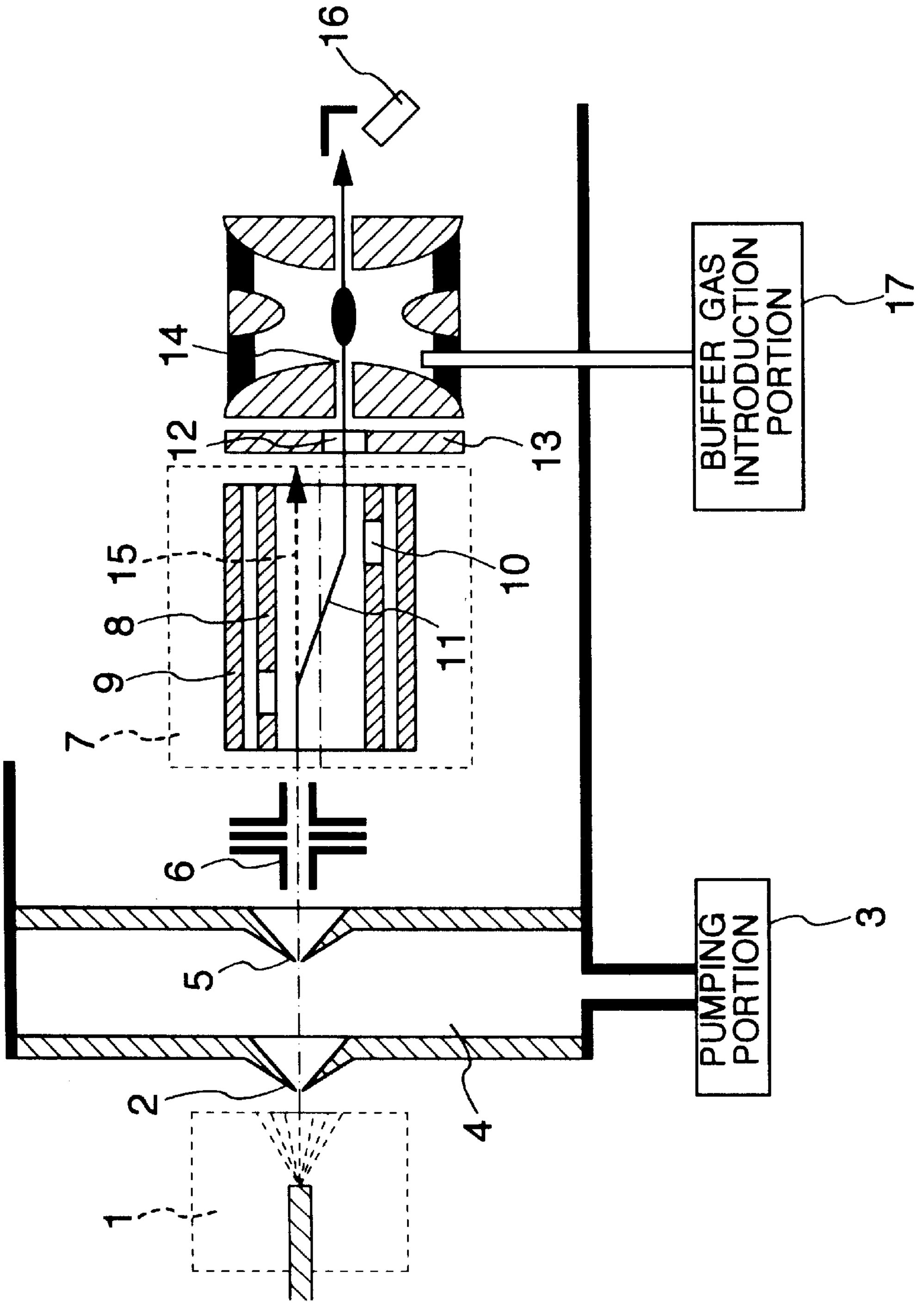
FIG. 10 PRIOR ART
FIG. 10 is a diagram of an apparatus configuration of a conventional mass spectrometer.
Figure 11:
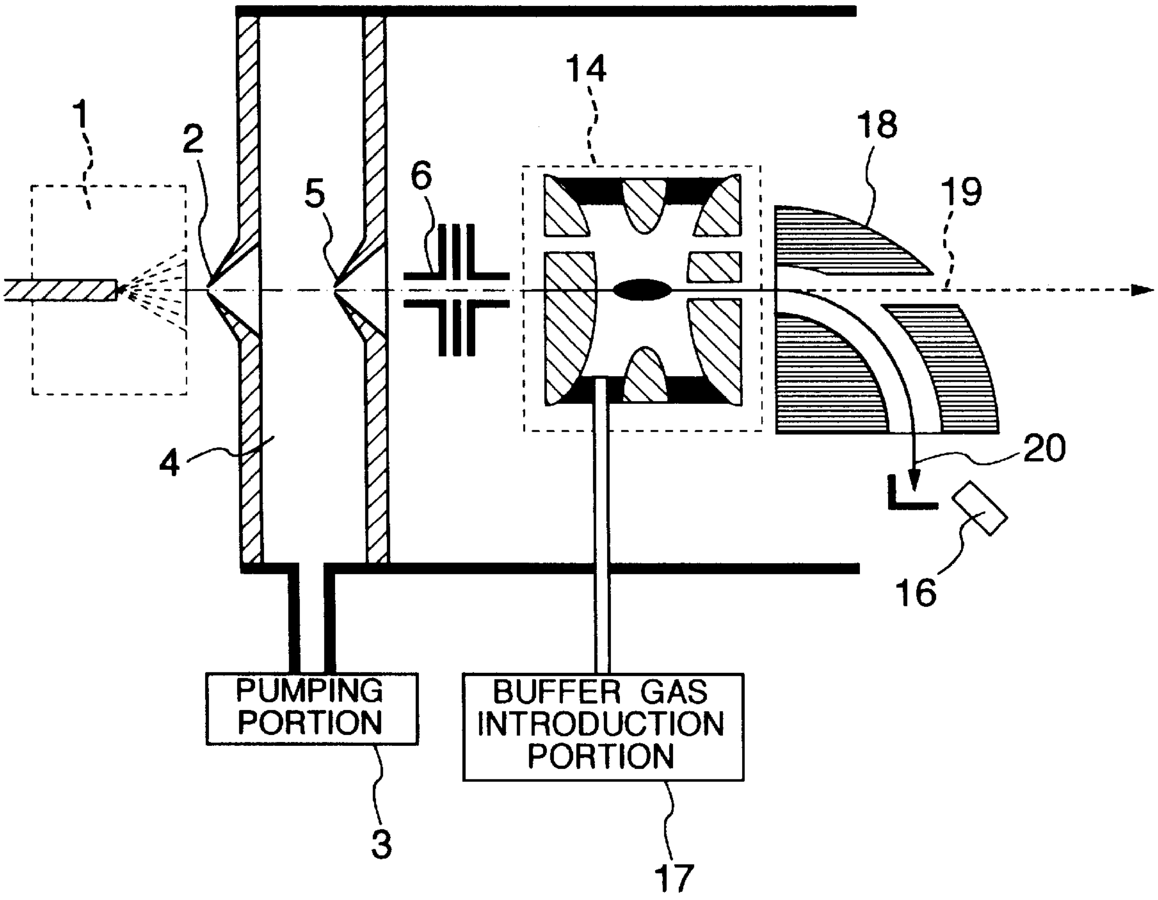
FIG. 11 PRIOR ART
FIG. 11 is a diagram of an apparatus configuration of a conventional mass spectrometer.

FIG. 9 is a detailed view of the ion trap mass analysis region depicted in FIG. 8. Although FIG. 9 shows the positions of the three electrodes as if the two endcap electrodes 31 and 32 were separated from the ring electrode 33, the center axes of the three electrodes are made to be coincident when the three electrodes are used in the apparatus. Ions and other particles are introduced into the ion trap mass analysis region through the ion input hole 21 opened in a position of the front endcap electrode 31 which is out of the center axis 34 thereof. After the ions are converged by the influence of the electric field and then mass-separated, the ions go on an orbit 11 indicated by a solid line and are outputted to the outside of the ion trap mass analysis region from the ion output hole 29 opened in the same front endcap electrode 32. On the contrary, the other particles are not influenced by the electric field so that the other particles go on an orbit 15 substantially straightly and are outputted to the outside of the ion trap mass analysis region from the opening portion 25 opened in the rear endcap electrode 32. The area of the opening portion 25 is larger than the area of the ion input hole 21. This is because it is taken into account that the other particles thus inputted are diffused in the inside of the ion trap mass analysis region. From the above description, the orbit of ions and the orbit of other particles can be separated from each other without use of any deflector, so that noise caused by the entrance of the other particles into the ion detector can be reduced.

According to the present invention, the orbit of ions and the orbit of other particles (such as large charged droplets, neutral particles, photons, etc. free from the influence of electric field or magnetic field) can be separated from each other without additional provision of any complex optical system such as an ion deflector, or the like. Accordingly, the other particles are prevented from reaching the ion detection portion, so that noise caused by the other particles can be reduced. As a result, a mass spectrometer having a small and simple structure and having high S/N can be provided.

What is claimed is:

1. An ion trap mass spectrometer provided with an ion trap mass analysis region comprising: two endcap electrodes disposed so as to be opposite to each other; one ring electrode disposed so as to enclose a space between said endcap electrodes; an input hole formed in one of said two endcap electrodes for inputting particles from outside of said three electrodes into said space surrounded by said three electrodes; a first output hole formed in another one of said two endcap electrodes for outputting particles which are not analyzed; and a second output hole formed in one of said two endcap electrodes for outputting ions to outside of said three electrodes from said space surrounded by said three electrodes so that ions are reserved in said space surrounded by said three electrodes for a predetermined time by using a high-frequency electric field, analyzed on the basis of a mass-to-charge ratio, and then outputted to the outside of said three electrodes through said second output hole, wherein said second output hole for detection of ions is present on a center axis of said endcap electrodes; and wherein, in said ion trap mass analysis region, said input hole and said output hole are both present in one of said endcap electrodes.

2. A mass spectrometer comprising:

an ion source for ionizing a sample solution;

an intermediate pressure region for introducing the sample ionized by said ion source into a vacuum region;

first and second electrodes disposed in said vacuum region in opposite to each other; and a third electrode disposed to enclose a space between said first and second electrodes;

wherein electric voltages are applied to said first, second and third electrodes, respectively, to form a high-frequency electric field in said space;

wherein said first electrode has a first opening for introducing said ionized sample from said intermediate pressure region into said space;

wherein said second electrode has a second opening for outputting particles which are substantially not influenced by the electric field in said space; and wherein there is a third opening for outputting ions having a predetermined mass-to-charge ratio which are substantially influenced by the electric field in said space.

3. A mass spectrometer according to claim 2, wherein said third electrode is a ring electrode.

4. A mass spectrometer according to claim 2, wherein a buffer gas is introduced in said space.

5. A mass spectrometer according to claim 4, wherein a buffer gas is an inert gas.

6. A mass spectrometer according to claim 2, wherein said first and second opening are disposed in coaxial with each other.

7. A mass spectrometer according to claim 2, wherein a sectional area of said second opening is larger than that of said first opening.

8. A mass spectrometer according to claim 2, wherein an axis of said first opening is deviated from an axis of said third opening.

9. A mass spectrometer according to claim 2, wherein at least one of said first, second and third openings is formed in an electric conductive mesh.

10. A mass spectrometer comprising:

first and second electrodes disposed in opposite to each other; and a third electrode disposed to enclose a space between said first and second electrodes;

wherein electric voltages are applied to said first, second and third electrodes, respectively, to form a high-frequency electric field in said space;

wherein said first electrode has a first opening for introducing sample particles including ions and neutral particles into said space;

wherein said second electrode has a second opening for outputting said neutral particles; and wherein a third opening is provided for outputting ions separated in said space at a position different from that of said second opening.

11. A mass spectrometer according to claim 10, wherein a buffer gas is introduced into said space.

12. A mass spectrometer according to claim 10, wherein an axis of said first opening is deviated from that of said third opening.

13. A mass spectrometer comprising:

first and second electrodes disposed in opposite to each other; and a third electrode disposed to enclose a space between said first and second electrodes;

wherein said first electrode has an entrance hole for introducing particles into said space;

wherein said second electrode has two exit holes for outputting neutral particles of said particles and ions separated in said space, respectively, said two exit holes are formed at positions different from each other; and wherein electric voltages are applied to said first, second and third electrodes, respectively, to analyze mass-to-charge ratio of said particles in said space.

14. A mass spectrometer according to claim 13, wherein one of said first, second and third electrodes is a ring electrode.

15. A mass spectrometer according to claim 13, wherein a buffer gas is introduced into said space.

16. A mass spectrometer comprising:

three electrodes;

a space formed by said three electrodes, said three electrodes having electric voltages applied to them, respectively, to form a high-frequency electric field in said space;

a first opening for introducing sample particles including ions and neutral particles into said space;

a second opening for outputting said neutral particles separated from said sample particles in said space;

a third opening for outputting ions having a predetermined mass-to-charge ratio, said outputted ions being influenced by the electric field in said space so as to be converged to a position of relatively low electric field potential as compared to an electric field potential in other positions in said space; and wherein said first and third openings or said second and third openings are formed in one of said three electrodes.

17. A mass spectrometer according to claim 16, wherein one of said three electrodes enclose said space.

18. A mass spectrometer according to claim 16, wherein a buffer gas is introduced into said space.

19. A mass spectrometer according to claim 16, wherein an axis of said first opening is different from an axis of said third position.

20. A mass spectrometer comprising:

first and second electrodes disposed in opposite to each other; and a third electrode disposed to enclose a space between said first and second electrodes;

wherein said first electrode has an entrance hole for introducing particles including ions and neutral particles into said space and an exit hole for outputting ions separated from said particles in said space;

wherein said second electrode has an opening for outputting said neutral particles from said space; and wherein electric voltages are applied to said first, second and third electrodes, respectively, to analyze mass-to-charge ratio of said particles in said space.

21. A mass spectrometer comprising:

an external ion source for ionizing a sample;

an ion trap mass analysis region including two endcap electrodes positioned opposite to each other and a ring electrode disposed to enclose a space between said endcap electrodes;

wherein electric voltages are applied to said ring electrode and said two endcap electrodes, respectively, to form a high-frequency electric field in said space;

wherein one of said two endcap electrodes has an ion entrance hole for introducing ions produced in said ion source into said ion trap mass analysis region;

wherein another one of said two endcap electrodes has an ion output hole for outputting ions analyzed in said ion trap mass analysis region;

a detector for detecting said ions outputted from said ion trap mass analysis region; and wherein an axis of said ion entrance hole is not aligned with a center axis of the endcap electrode having said entrance hole.

22. A mass spectrometer comprising:

an external ion source for ionizing a sample;

an ion trap mass analysis region including two endcap electrodes positioned opposite to each other and a ring electrode disposed to enclose a space between said endcap electrodes;

wherein electric voltages are applied to said ring electrode and said two endcap electrodes, respectively, to form a high-frequency electric field in said space;

wherein one of said two endcap electrodes has an ion entrance hole for introducing ions produced in said ion source into said ion trap mass analysis region;

wherein another one of said two endcap electrodes has an ion output hole for outputting ions analyzed in said ion trap mass analysis region;

a detector for detecting said ions outputted from said ion trap mass analysis region; and wherein an axis of said ion entrance hole is not aligned with a position at which said detector is disposed.

23. A mass spectrometer comprising:

an external ion source for ionizing a sample;

an ion trap mass analysis region including two endcap electrodes positioned opposite to each other and a ring electrode disposed to enclose a space between said endcap electrodes;

wherein electric voltages are applied to said ring electrode and said two endcap electrodes, respectively, to form a high-frequency electric field in said space;

wherein one of said two endcap electrodes has an ion entrance hole for introducing ions produced in said ion source into said ion trap mass analysis region;

wherein said endcap electrode having said ion entrance hole has an ion output hole for outputting ions analyzed in said ion trap mass analysis region;

a detector for detecting said ions outputted from said ion trap mass analysis region; and wherein an axis of said ion entrance hole not aligned with a center axis of the endcap electrode having said entrance hole.

24. A mass spectrometer comprising:

an external ion source for ionizing a sample;

an ion trap mass analysis region including two endcap electrodes positioned opposite to each other and a ring electrode disposed to enclose a space between said endcap electrodes;

wherein electric voltages are applied to said ring electrode and said two endcap electrodes, respectively, to form a high-frequency electric field in said space;

wherein one of said two endcap electrodes has an ion entrance hole for introducing ions produced in said ion source into said ion trap mass analysis region;

wherein said endcap electrode having said ion entrance hole has an ion output hole for outputting ions analyzed in said ion trap mass analysis region;

a detector for detecting said ions outputted from said ion trap mass analysis region; and wherein an axis of said ion entrance hole not aligned with a position at which said detector is disposed.

* * * * *